Patented Feb. 16, 1932

1,845,813

UNITED STATES PATENT OFFICE

ROBERT K. PRINCE, OF WESTFIELD, MASSACHUSETTS, ASSIGNOR TO WILLIAM J. DAVIDSON, OF NEWTON, MASSACHUSETTS, AND ELBERT A. HARVEY, OF BROOKLINE, MASSACHUSETTS, TRUSTEES

VITAMIN CONCENTRATE AND METHOD OF PREPARATION

No Drawing. Application filed September 1, 1928. Serial No. 303,614.

In my application Serial No. 303,613, filed Sept. 1, 1928, I have described a vitamin concentrate in the form of a blend of dehydrated, pulverized vegetables and containing the vitamins in optimum ratio for making up vitamin deficiencies in human diet, and a method of preparing the same. As outlined in that application, vegetables which are rich in the different vitamins are first dehydrated, then pulverized to a finely divided condition, and then blended in the desired proportion, the blend being consumed as such, or after being compressed into tablets of the desired size.

According to the present invention, a vitamin concentrate of the character described is prepared, having a content of certain vitamins in excess of that naturally associated with the vegetable material from which the concentrate is made. This is accomplished by removing the desired vitamins from vitamin-bearing materials rich in these vitamins and adding and fixing the removed vitamins to and throughout the vegetable blend.

The present invention is especially applicable in the production of a product having a vitamin A and D content greatly in excess of that normally associated with the dehydrated vegetable blend alone, these being soluble in solvents such as chloroform, ether, benzol or the like, and being known as the "fat soluble" vitamins. This may be accomplished by treating dehydrated vegetables rich in vitamins A and D with a suitable solvent for these vitamins, concentrating the solution, mixing the concentrated solution with a dehydrated vegetable blend such as described, and evaporating the solvent therefrom. This produces a fixation of the dissolved A and D vitamins together with other dissolved components on the vegtable blend, resulting in a vitamin concentrate especially rich in these two vitamins. The resulting product is not only effective in making up vitamin deficiencies in human diet, but is especially suitable for curing ailments or diseases attributable to the deficiency of A and D vitamins in the system.

The general procedure which I follow is first to prepare a dehydrated, pulverized blend of vegetables as described in my other application. I then take vegetables which are rich in A and D vitamins, e. g., green cabbage and/or spinach, and prepare them for solvent treatment. To this end, the vegetables are preferably first washed, then cut into strips, and dehydrated, whereupon the dehydrated vegetables as such or after pulverization are treated with a suitable A and D vitamin solvent, such as chloroform. After the solvent treatment has been completed, the solution is concentrated by evaporating the solvent until a comparatively viscous, oily concentrate is produced. The concentrate is then homogeneously mixed with the blend of dehydrated, pulverized vegetables, the rest of the solvent then being evaporated so that only the solute remains in the blend. The resulting product is not only enriched in A and D vitamin content, but also in chlorophyll, gums, resins, oils, and other components which are soluble in the particular solvent used.

A specific example of procedure which may be followed in producing a product of the desired character may be substantially as follows. I first prepare a dehydrated pulverized blend of vegetables, the vegetables employed as raw materials preferably being spinach, green cabbage, white cabbage, lettuce, and carrot, as all these vegetables are comparatively inexpensive and are rich in one or more of the various vitamins, spinach being rich in vitamins A and D, green cabbage in vitamins A and D, white cabbage in vitamins D and C, lettuce in vitamin E, and carrot in vitamins A, B, and C. If desired, carrot may be omitted and the proportion of spinach and white cabbage increased to furnish the desired A, B, and C vitamin content. So, too, the other vegetables may be replaced by other vegetables having a correspondingly rich vitamin content, but those enumerated are preferable, owing to their economy and great stability under processing and ageing of the final product. Thus, I may use wheat germ for the purpose of A, D and E vitamins, or tomato for its C vitamin, but these raw materials possess certain disadvantages, as, for instance, the liability to rancidity produced by the introduction of oil along with the wheat germ. In the case of the leafy vegetables, the leaves are separated from the roots and are then preferably washed with relatively cold water, as this does not injure the vegetables or the vitamins associated therewith. They are then cut into strips of, say, ½" width. The carrots are also preferably washed as in a washer of the foraminous drum type, wherein the carrots are allowed to tumble while a stream of relatively cold water is allowed to play thereon. The washed carrots are cut into slices of a thickness of say, about $\frac{1}{16}$ of an inch. The washed vegetables are spread on trays, and the trays placed on racks in a dehydrating chamber, warm air at a temperature of about 90° to 110° F. being allowed to sweep the trays, after which it is exhausted from the chamber. Dehydration under these conditions does not cause a material reduction in the vitamin content of the vegetables, nor does it induce radical enzymatic action, or even disturb the cellulose structure or cause caramelization. In certain cases, it may be preferable to effect dehydration under non-oxidizing conditions, for instance with warm, oxygen-free gas such as carbon dioxide or nitrogen rather than with air, as under such conditions the resulting product has a higher vitamin A content,— usually about 15% higher than when warm air is employed for dehydration. The dehydrating operation is continued until the vegetables have been reduced from their initial moisture content of about 90% to a residual moisture content of about 3% to 6%, this representing the minimum moisture content which may be attained under the temperature conditions given, the precise amount of residual moisture in any case depending upon the humidity of the dehydrating air employed.

The leafy dehydrated vegetables are crisp and so lend themselves to pulverization to a fine condition in any suitable type of grinding mill. For example, they may be readily reduced to about 150 to 300 mesh by passing through a coffee mill, there being little tendency for the particles to adhere to or clog the mill. The dehydrated carrot, however, is comparatively tough, owing to its binder content in the form of sugar, oil, gums and resin. It tends to adhere to and clog grinders of the coffee grinder type, but may be readily pulverized in disintegrators of the Mead type to a particle size of about 150 to 300 mesh. The pulverized vegetables are mixed to produce a physical homogeneous blend of about the following composition:

|  | Per cent |
|---|---|
| Spinach | 10 to 20 |
| Green cabbage | 5 to 15 |
| White cabbage | 25 to 40 |
| Lettuce | 3 to 7 |
| Carrot | 20 to 40 |

Preferably, about 80% to 90% of the vegetables of the blend are pulverized to about 150 to 300 mesh and about 10% to 20% of the vegetables to about 80 to 100 mesh, as such a blend when subjected to the high compressions of a tablet-forming machine yields comparatively tough, strong tablets without the use of any binding medium.

I then take dehydrated vegetables such as green cabbage, spinach, and carrot, which are rich in A and D vitamins, and treat them with a suitable A and D vitamin solvent, such as chloroform. The treatment may be carried out most effectively on dehydrated vegetables in a pulverulent condition, as this makes possible uniform and intimate contact of the vegetables and the solvent. The following illustrates one method of treatment which gives satisfactory results. Ten pounds of dehydrated, pulverized vegetables consisting of a blend of, say, equal parts by weight of spinach, cabbage, and carrot, are treated with about three gallons of chloroform. This may be done at room temperature in any suitable extractor, for instance in a percolator extractor, the solvent being passed one or more times through a mass of the vegetables supported on a suitable screen or filter plate. The air in the extractor may be replaced by a non-oxidizing gas, such as carbon dioxide or nitrogen, to prevent loss in vitamins during extraction.

After treatment has been completed, the vegetables may be pressed to remove solvent absorbed thereby, and the resulting solution added to the rest of the solution from the extractor, in the example given about 2½ gallons of solution being obtained. The solution is concentrated by evaporating the solvent until a comparatively viscous, oily concentrate results, at which stage of evaporation the volume of concentrate is about one-half gallon. The concentrate is mixed with the dehydrated, pulverized blend of vegetables previously prepared, the volume of concentrate mixed therewith depending upon the increase in A and D vitamin content which it is desired to produce therein. For instance, the entire half-gallon of concentrate may be mixed with a dehydrated, pulverized blend of the composition hereinbefore described contained 10 pounds of vitamin A and D-bearing vegetables in the form of spinach, cabbage, and carrot, in which case the vitamin A and D content of the composition should theoretically be approximately doubled, whereupon the remaining chloroform is evaporated from the mixture, preferably in vacuo, to effect the fixation or deposition of the solute in situ throughout the product. The resulting product, when tested for A and D vitamin content by biological feeding tests, indicates that the concentrate has increased the vitamin A and D content of the vegetable blend about 75% to 85%, or, in other words, that extraction of the A and D vitamin content by solvent treatment is about 75% to 85% effective. The resulting product may again be enriched with other concentrate to a point where its A and D vitamin content is many times its original vitamin content, should this be desired.

The resulting product may be consumed as such, that is, it may be incorporated into foodstuffs, or it may be compressed into tablets of the desired form and size by the usual commercial tablet machines, tablets of approximately 4-grain size being preferably, as they may be swallowed readily. The product when stored out of contact with the air and sunlight shows no appreciable loss in vitamin content or depreciation in other respects, the loss in A vitamin content after a year amounting to only about 20%. Owing to the finely divided condition of the vitamin-containing material in the product, the system is able to extract a much larger percentage of the vitamins than would be the case if sufficient vegetables in a raw or cooked state having the same total vitamin content were consumed.

Having thus described the nature of this invention, and certain examples of its application, it will be evident to those skilled in the art that these examples are capable of change and modification without departing from the spirit or scope of invention as defined by the appended claims.

What I claim is:

1. A vitamin concentrate in tablet form, consisting substantially only of a dehydrated blend of various vegetables in a pulverulent, compressed condition and containing the vitamins, said concentrate having a vitamin A and D content greatly in excess of that normally associated with the dehydrated vegetables alone, and said excess being vegetable-derived but being added to said blend without the solids and aqueous juices of the derivation vegetables.

2. A vitamin concentrate in tablet form, consisting substantially only of a dehydrated pulverized and compressed blend of the following vegetables in substantially the following proportions:

| | Per cent |
|---|---|
| Spinach | 10 to 20 |
| Green cabbage | 5 to 15 |
| White cabbage | 25 to 40 |
| Lettuce | 3 to 7 |
| Carrot | 20 to 40 | said concentrate having a vitamin A and D content of about 75% to 85% in excess of that normally associated with said dehydrated vegetables and said excess being vegetable-derived but being added to said blend without the solids an aqueous juices of the derivation vegetables.

3. A process which comprises treating dehydrated vegetables rich in vitamins A and D with a non-aqueous solvent for these vitamins, concentrating the resulting solution, mixing the concentrate with a dehyrated, pulverized blend of vegetables containing the vitamins, and removing the remaining solvent from the mixture.

4. A process which comprises treating dehydrated, pulverized vegetables rich in vitamins A and D with a non-aqueous volatile solvent for these vitamins. concentrating the resulting solution until a comparatively viscous, oily concentrate results, mixing the concentrate with a dehydrated, pulverized blend of vegetables containing the vitamins, evaporating the solvent to fix the solution in situ throughout the mixture, and compressing to tablet form.

In testimony whereof I have affixed my signature.

ROBERT K. PRINCE.